United States Patent
Lee et al.

(10) Patent No.: US 7,121,719 B2
(45) Date of Patent: Oct. 17, 2006

(54) RADIO-THERMOMETER SYSTEM AND METHOD FOR MEASURING ELECTROMAGNETIC ENERGY RADIATED FROM AN INTERIOR OF A HUMAN BODY USING THE SAME

(75) Inventors: Jeonghwan Lee, Suwon-si (KR); V.A. Rassadovsky, Nizhny Novgorod (RU); S.N. Kleshnin, Nizhny Novgorod (RU); I.F. Belov, Nizhny Novgorod (RU); V.I. Tereschenkov, Nizhny Novgorod (RU); O.P. Sobolev, Nizhny Novgorod (RU); T.N. Aleshina, Nizhny Novgorod (RU); V.A. Obolensky, Nizhny Novgorod (RU)

(73) Assignees: Samsung Electronics Co., Ltd., Suwon-si (KR); Nizhny Novgorod Microwave Research Institute, Ltd., Nizhny Novgorod (RU)

( * ) Notice: Subject to any disclaimer, the term of this patent is extended or adjusted under 35 U.S.C. 154(b) by 38 days.

(21) Appl. No.: 10/966,037

(22) Filed: Oct. 18, 2004

(65) Prior Publication Data

US 2005/0190815 A1   Sep. 1, 2005

(30) Foreign Application Priority Data

Oct. 16, 2003   (KR) .................. 10-2003-0072255

(51) Int. Cl.
*G01J 5/00* (2006.01)
(52) U.S. Cl. ....................... 374/122; 324/646
(58) Field of Classification Search ........... 374/122, 374/32, 1, 175; 324/642, 646; 342/351

See application file for complete search history.

(56) References Cited

U.S. PATENT DOCUMENTS

| | | | |
|---|---|---|---|
| 4,235,107 A | | 11/1980 | Ludeke et al. |
| 4,557,272 A | * | 12/1985 | Carr ........................... 600/549 |
| 4,627,442 A | * | 12/1986 | Land .......................... 600/549 |
| 5,176,146 A | | 1/1993 | Chive et al. |
| 5,341,814 A | * | 8/1994 | Van De Velde et al. .... 600/549 |

(Continued)

FOREIGN PATENT DOCUMENTS

FR   2 650 390   2/1991

(Continued)

OTHER PUBLICATIONS

Luedeke, A New Radiation Balance Microwave Thermograph for Simultaneous and Independent Temperature and Emissivity Measurements, Journal of Microwave Power, 14(2):117-121 (1979).

*Primary Examiner*—Diego Gutierrez
*Assistant Examiner*—Stanley J. Pruchnic, Jr.
(74) *Attorney, Agent, or Firm*—Lee & Morse, P.C.

(57) ABSTRACT

A radio-thermometer system, and a method for measuring electromagnetic energy radiated from an interior of a human body, includes an antenna for receiving thermal energy radiated from a target object having a temperature to be measured, first and second noise sources, which are maintained at different temperatures in order to obtain a reflection coefficient of an interface between the antenna and the target object, a first switch for periodically switching between outputting the first or second noise source, a circulator for adding a signal received by the antenna to a reflective wave output from the first switch, and for transmitting an addition result, third and fourth noise sources, which are maintained at different temperatures, a second switch for periodically switching between outputting an output of the third noise source, the circulator, and the fourth noise source, and an amplifier for amplifying an output of the second switch.

11 Claims, 4 Drawing Sheets

U.S. PATENT DOCUMENTS 5,354,325 A * 10/1994 Chive et al. ............... 607/101
5,949,845 A     9/1999 Sterzer
6,964,514 B1 * 11/2005 Land ......................... 374/122

FOREIGN PATENT DOCUMENTS

WO    WO 01/67056 A1 *  9/2001
WO    WO 01/67057 A1     9/2001

* cited by examiner

RADIO-THERMOMETER SYSTEM AND METHOD FOR MEASURING ELECTROMAGNETIC ENERGY RADIATED FROM AN INTERIOR OF A HUMAN BODY USING THE SAME

BACKGROUND OF THE INVENTION

1. Field of the Invention

The present invention relates to a radio-thermometer system. More particularly, the present invention relates to a radio-thermometer system and method for measuring electromagnetic energy radiated from an interior of a human body using the same.

2. Description of the Related Art

Ordinary objects emit electromagnetic energy in a predetermined frequency band at an absolute temperature of 0° K. or higher. Some objects, however, completely absorb energy around them and emit electromagnetic energy in nearly all frequency bands. These objects are called black bodies and radiate energy according to Plank's radiation law, which will be explained in connection with a graph shown in FIG. 1.

FIG. 1 illustrates a variation of an intensity of radiant energy of a black body with respect to frequency. Referring to FIG. 1, the intensity of radiant energy of a black body varies from frequency to frequency and peaks in the infrared range, i.e., between 3–15 μm. Generally, radiant energy of a black body in the infrared range can be detected using an infrared camera, while radiant energy of the black body in a microwave range can be detected using a radio-thermometer having a directional antenna and a high sensitivity receiver. Radio-thermometers, which were first adopted in the field of astronomy, have been used primarily for measuring energy radiated from planets or stars in the universe and estimating the temperatures of those planets or stars.

Given that in the infrared range, human skin exhibits almost the same energy characteristics as a black body, a distribution of temperatures on the surface of the human body can be obtained by measuring energy radiating from the human skin in the infrared range. Recently, radio-thermometers have been increasingly used for receiving energy from tissue within the human body and for measuring a temperature of those tissues.

Human skin, however, does not act as a black body in a microwave frequency range. Thus, not all of the electromagnetic energy radiated from inner tissues within the human body is transmitted to the surface, i.e., the skin. The intensity of the electromagnetic energy transmitted from the inner tissues of the body to the skin may vary depending on through which medium, e.g., muscle, bone, or fat, the electromagnetic energy travels between the tissue and the skin. Radio-thermometers using microwaves estimate an internal temperature of a human body by measuring electromagnetic energy radiated from the human body having a frequency of 1 GHz–6 GHz at the surface, i.e., the skin, of the body.

FIG. 2 is a diagram illustrating a conventional radio-thermometer system 20 using microwaves. Referring to FIG. 2, a signal output from a noise source 9, which is controllable, is input to a first attenuator 10, which is adjustable, and then to a directional coupler 13, which is connected, via an antenna 4, to a target object 1 having a temperature to be measured. The signal output from the controllable noise source 9 is also input to a second attenuator 11, which is adjustable, and then to a first terminal of a switch 2. A second terminal of the switch 2 receives energy emitted from the target object 1 and energy reflected from the target object 1. The switch 2 is periodically switched by a clock pulse generator in a radio-thermometer 8. A signal output from the radio-thermometer 8 is provided to an output terminal, via an integrator 14, as a voltage $U_a$ corresponding to a temperature $T_o$ of the target object 1. The conventional radio-thermometer system 20 measures an internal temperature of the target object 1 by adjusting the noise source 9 several times.

Difficulties in obtaining an accurate internal temperature measurement by the conventional radio-thermometer system 20 may be caused by interference of electromagnetic waves in and around the conventional radio-thermometer system 20 or by an impedance mismatch at an interface between the antenna 4 and the target object 1. The problem of the interference of electromagnetic waves can be solved by taking measurements in an electromagnetic wave shielded room. However, the problem of impedance mismatch at the interface between the antenna 4 and the target object 1 remains responsible for a lack of reproducibility and thus causes errors in the measurement.

Therefore, it is necessary to develop a new radio-thermometer system that is able to precisely measure the temperature of the target object 1 even though an impedance mismatch occurs at the interface between the antenna 4 and the target object 1.

SUMMARY OF THE INVENTION

The present invention is therefore directed to a radio-thermometer system and method for measuring electromagnetic energy radiated from an interior of a human body using the same, which substantially overcome one or more of the problems due to the limitations and disadvantages of the related art.

It is a feature of an embodiment of the present invention to provide a radio-thermometer system, and a method for measuring electromagnetic energy radiated from an interior of a human body, that is able to achieve high precision and reproducibility of measurement of electromagnetic waves emitted from a human body by solving a problem of impedance mismatch at an interface between an antenna and the human body.

It is another feature of an embodiment of the present invention to provide a radio-thermometer system, and a method for measuring electromagnetic energy radiated from an interior of a human body, that is able to estimate an internal temperature of a human body based on the temperature of an antenna measured by automatically calculating a reflection coefficient of an interface between the antenna and the body and then compensating for an impedance mismatch between interface between the antenna and the body by as much as the reflection coefficient.

At least one of the above features and other advantages may be provided by a radio-thermometer system including an antenna for receiving thermal energy radiated from a target object having a temperature T to be measured, first and second noise sources, which are maintained at different temperatures in order to obtain a reflection coefficient Γ of an interface between the antenna and the target object, a first switch for periodically switching between outputting an output of the first or second noise source in response to a first pulse signal, a circulator for adding a signal received by the antenna to a reflective wave output from the first or second noise source, via the first switch, and for transmitting an addition result in one direction, third and fourth noise sources, which are maintained at different temperatures, a second switch for periodically switching between outputting an output of the third noise source, an output of the circulator, and an output of the fourth noise source in response to a second pulse signal, the second pulse signal being in synchronization with the first pulse signal, and an amplifier for amplifying an output of the second switch.

The temperature T of the target object may be obtained using the following equation:

$$T_A = \alpha[T(1-\Gamma) + T_{rec}\Gamma]$$

where $\alpha$ is a signal transmission coefficient of the antenna, and $T_{rec}$ is an effective noise temperature of the radio-thermometer system, and the reflection coefficient $\Gamma$ is obtained by the following equation:

$$\Gamma = \frac{\Delta U \cdot M}{\alpha \cdot 2\Delta T}, \text{ where}$$

$$\Delta U = \Delta U''^k_{st2} - \Delta U'^k_{st2} = \Delta U''^k_{st1} - \Delta U'^k_{st1},$$

$$M = \frac{\alpha(1-\Gamma_{st})(T^k_{st2} - T^k_{st1})}{(\Delta \overline{U}^k_{st2} - \Delta \overline{U}^k_{st1})}, T^k_{st1} \text{ and } T^k_{st2}$$

are the first and second reference temperatures, respectively, which are used to calibrate the radio-thermometer system, $\Delta U'^k_{st1}$ is an output of the radio-thermometer system when the radio-thermometer system contacts a first reference object having the first reference temperature $T^k_{st1}$, and the first noise source is connected to the radio-thermometer system, $\Delta U''^k_{st1}$ is an output of the radio-thermometer system when the radio-thermometer system contacts the first reference object having the first reference temperature $T^k_{st1}$, and the second noise source is connected to the radio-thermometer system, $\Delta U'^k_{st2}$ is an output of the radio-thermometer system when the radio-thermometer system contacts a second reference object having the second reference temperature $T^k_{st2}$, and the first noise source is connected to the radio-thermometer system, and $\Delta U''^k_{st2}$ is an output of the radio-thermometer system when the radio-thermometer system contacts the second reference object having the second reference temperature $T^k_{st2}$, and the second noise source is connected to the radio-thermometer system.

The first and third noise sources may be maintained at the same temperature, and the second and fourth noise sources may be maintained at the same temperature. The first and third noise sources may be maintained at a temperature of about 32° C. (89.6° F.), and the second and fourth noise sources may be maintained at a temperature of about 42° C. (107.6° F.). The first reference temperature may be set to about 32° C. (89.6° F.), and the second reference temperature may be set to about 42° C. (107.6° F.).

At least one of the above features and other advantages may be provided by a method of measuring electromagnetic energy radiated from a human body using a radio-thermometer system including connecting an antenna to a target object having a temperature to be measured, providing first through fourth noise sources, enabling a first switch to periodically switch between outputting an output of the first noise source or an output of the second noise source in response to a first pulse signal, adding a signal received by the antenna to the output of the first switch and transmitting an addition result in one direction, enabling a second switch to periodically switch between outputting an output of the third noise source, the addition result, or an output of the fourth noise source in response to a second pulse signal, the second pulse signal being in synchronization with the first pulse signal, and amplifying an output of the second switch to a predetermined level.

The method may further include calibrating the radio-thermometer system using a first reference object having a first reference temperature and a second reference object having a second reference temperature.

The method may further include determining a reflection coefficient, the reflection coefficient being proportional to a difference between an output of the radio-thermometer system when the radio-thermometer system contacts the first reference object having the first reference temperature and the first noise source is connected to the radio-thermometer system and an output of the radio-thermometer system when the radio-thermometer system contacts the first reference object having the first reference temperature and the second noise source is connected to the radio-thermometer system. The method may further include determining a reflection coefficient, the reflection coefficient being proportional to a difference between an output of the radio-thermometer system when the radio-thermometer system contacts the second reference object having the second reference temperature and the first noise source is connected to the radio-thermometer system and an output of the radio-thermometer system when the radio-thermometer system contacts the second reference object having the second reference temperature and the second noise source is connected to the radio-thermometer system.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

Figure 1:
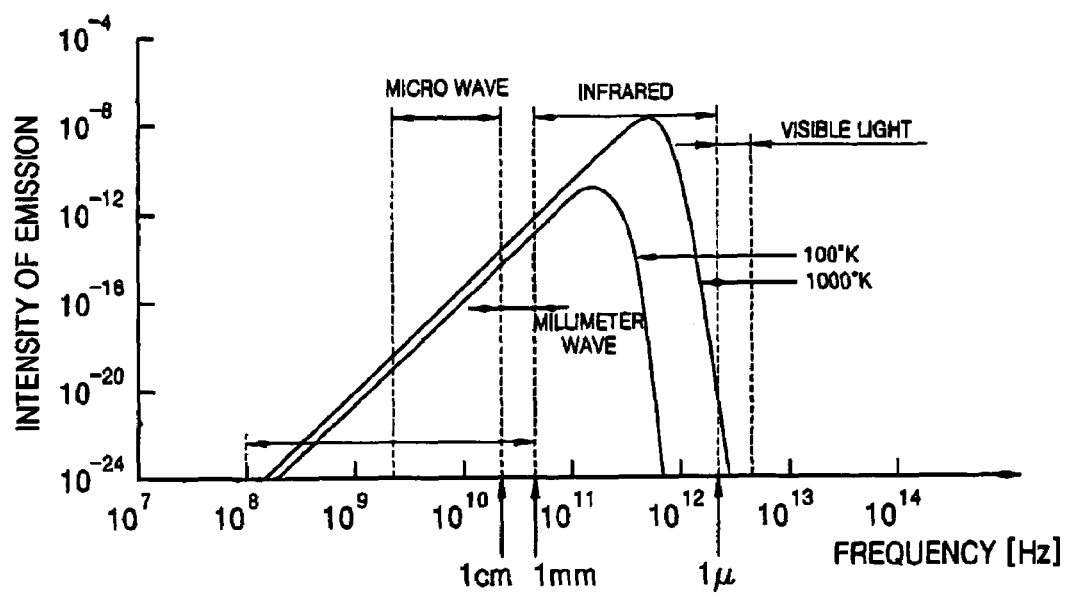
FIG. 1 is a graph illustrating Planck's radiation law.
Figure 2:
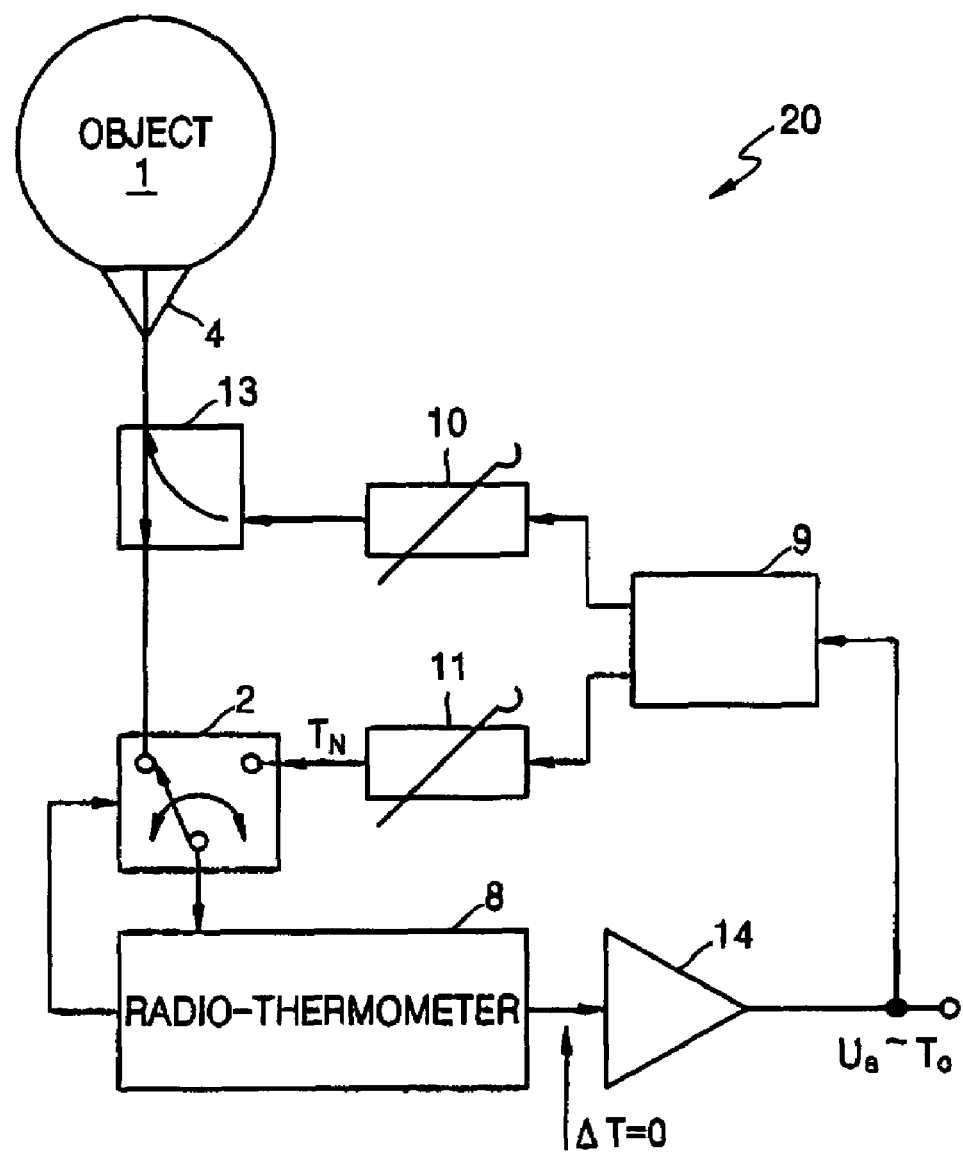
FIG. 2 is a diagram illustrating a conventional radio-thermometer system using microwaves.

Korean Patent Application No. 2003-72255, filed on Oct. 16, 2003, in the Korean Intellectual Property Office, and entitled: "Method and Radio-Thermometer for Measuring Electromagnetic Energy Radiated from Inside of Human Body," is incorporated by reference herein in its entirety.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals and characters indicate like elements throughout.

Figure 3:
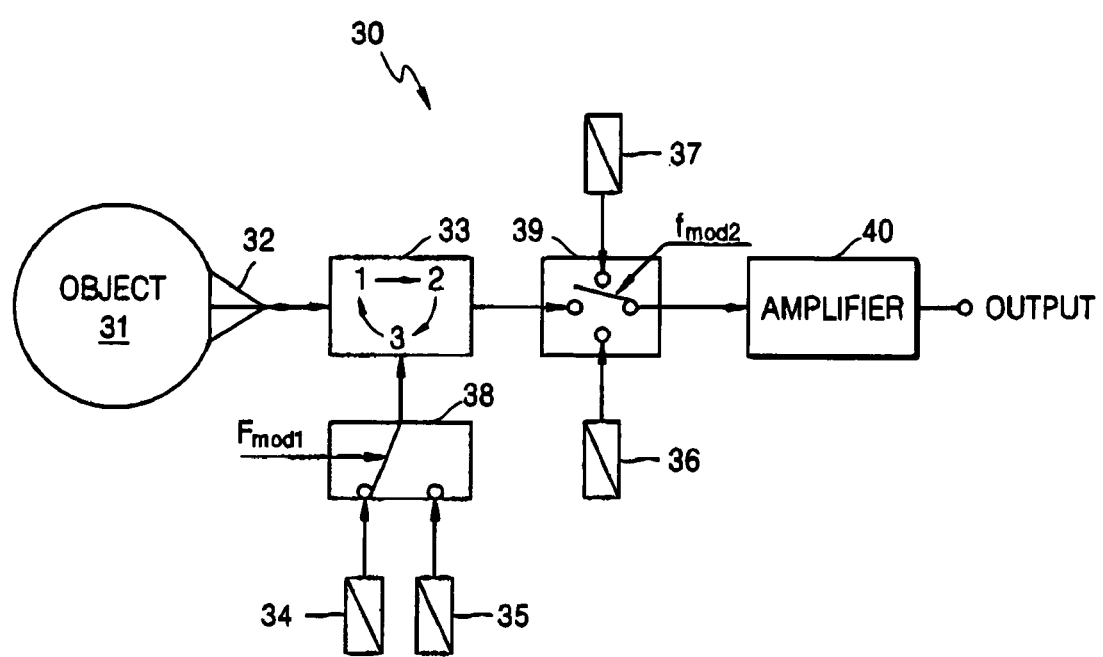
FIG. 3 is a diagram illustrating a radio-thermometer system according to an exemplary embodiment of the present invention.

FIG. 3 is a diagram illustrating a radio-thermometer system 30 according to an exemplary embodiment of the present invention. Referring to FIG. 3, the radio-thermometer system 30 includes an antenna 32, which receives radiant energy radiated from a target object 31, a circulator 33, first through fourth noise sources 34 through 37, first and second switches 38 and 39, and an amplifier 40. Each of the first through fourth noise sources 34 through 37 is set to a reference temperature, which is either higher or lower than the temperature of energy radiated from the target object 31. In the present embodiment, the target object 31 is a human body, which has a normal internal temperature of 37° C. (98.6° F.). The first and third noise sources 34 and 36, which provide a reference temperature for use in determining the temperature of the target object 31, are set to a first reference temperature, e.g., about 32° C. (89.6° F.), which is lower than the normal internal temperature of a human body. The second and fourth noise sources 35 and 37, which also provide a reference temperature for use in determining the temperature of the target object 31, are set to a second reference temperature, e.g., about 42° C. (107.6° F.), which is higher than the normal internal temperature of a human body. Thus, ΔT is defined as half of the difference in the temperature between the third and fourth noise sources 36 and 37.

The circulator 33 adds a signal received by the antenna 32 to a reflective wave output from the first or second noise source 34 or 35, respectively, and transmits the addition result to the second switch 39. A characteristic of the circulator 33 is to output the output thereof in one direction. The first switch 38 is a 2×1 switch, and is periodically switched to transmit the first noise source 34 or the second noise source 35 to the circulator 33 in response to a first pulse signal $F_{mod1}$. The second switch 39 is a 3×1 switch, and is periodically switched to transmit the third noise source 36, the circulator 33, or the fourth noise source 37 to the amplifier 40 in response to a second pulse signal $F_{mod2}$. The first and second pulse signals $F_{mod1}$ and $F_{mod2}$ are provided by a typical digital pulse divider circuit and are in synchronization with each other. The amplifier 40 amplifies a signal output from the second switch 39 to a predetermined level because the initial magnitude of the signal is very small.

Figure 4:
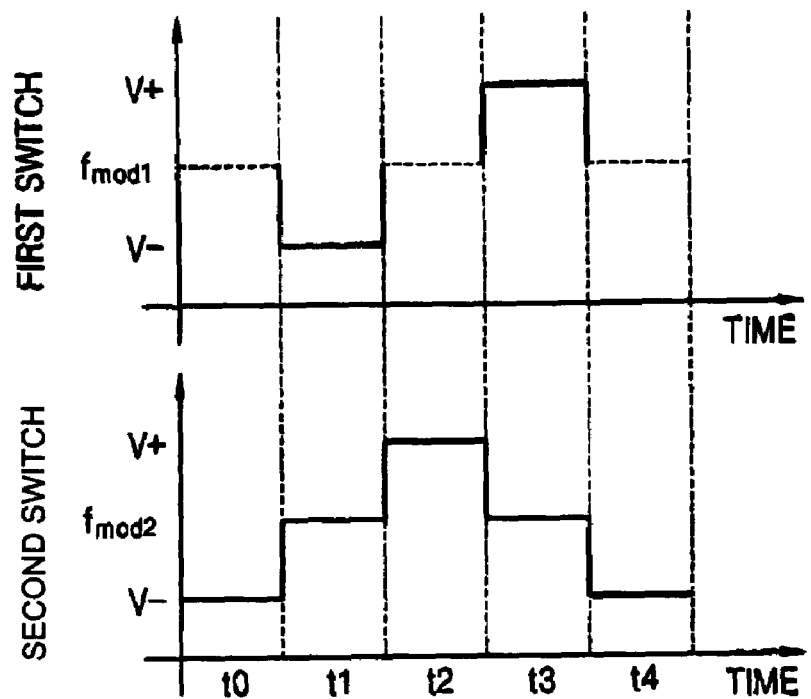
FIG. 4 is a graph illustrating the waveforms of outputs of first and second switches of the radio-thermometer system of FIG. 3.

FIG. 4 illustrates waveforms of outputs of the first and second switches 38 and 39 in an upper portion and a lower portion of the graph, respectively. Referring to FIG. 4, during a first period of time t0, the first switch 38 has no output level, and the second switch 39 has an output level of V−, which is equal to an output level of the third noise source 36. During a second period of time t1, the first switch 38 has an output level of V−, which is equal to an output level of the first noise source 34, and the second switch 39 has the same output level as the circulator 33. During a third period of time t2, the first switch 38 has no output level, and the second switch 39 has an output level of V+, which is equal to an output level of the fourth noise source 37. During a fourth period of time t3, the first switch 38 has an output level of V+, which is the same output level as the second noise source 35, and the second switch 39 has the same output level as the circulator 33. During a fifth period of time t4, the first switch 38 has no output level, and the second switch 39 has an output level of V−, which is equal to the output level of the third noise source 36. The waveforms of the signals output from the first and second switches 38 or 39 during the first through fifth periods of time t0 through t4 are subsequently repeated.

As shown in FIG. 4, the second switch 39 has the same output level as the circulator 33 during the second and fourth period of time t1 and t3, which means the signal output from the first or second noise source 34 or 35 is transmitted to the circulator 33, added to the signal received by the antenna 32, and then this addition result is transmitted to the second switch 39.

A total of four signal sources are provided in the radio-thermometer system 30, i.e., first through fourth signal sources. The first signal source $T_A^-$ is a result of adding a signal $T_A$ received by the antenna 32 to the output of the first noise source 34. The second signal source $T_A^+$ is a result of adding the signal $T_A$ received by the antenna 32 to the output of the second noise source 35. The third signal source $T_1$ is the output of the third noise source 36. The fourth signal source $T_2$ is the output of the fourth noise source 37. The waveform of an output of the radio-thermometer system 30 in response to the output of the first or second noise source 34 or 35, respectively, is illustrated in FIG. 5.

Figure 5:
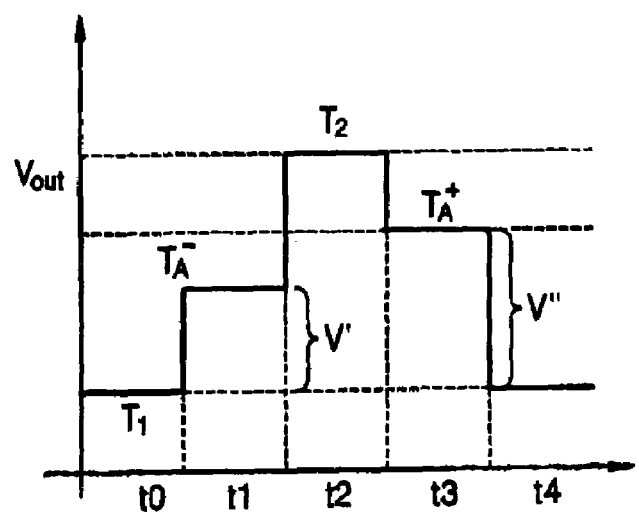
FIG. 5 is a graph illustrating the waveform of an output from the radio-thermometer system of FIG. 3.

As shown in FIG. 5, during the first period of time t0, the output of the radio-thermometer 30 is the output $T_1$ of the second noise source 35. During the second period of time t1, the output of the radio-thermometer 30 is the first signal source $T_A^-$, which is a result of adding a signal $T_A$ received by the antenna 32 to the output of the first noise source 34. During the third period of time t2, the output of the radio-thermometer 30 is the fourth signal source, which is the output $T_2$ of the fourth noise source 37. During the fourth period of time t3, the output of the radio-thermometer 30 is the second signal source $T_A^+$, which is a result of adding the signal $T_A$ received by the antenna 32 to the output $T_1$ of the second noise source 35. During the fifth period of time t4, the output of the radio-thermometer 30 is the output $T_1$ of the second noise source 35. In FIG. 5, a difference between the first signal source $T_A^-$ and the output $T_1$ of the second noise source 35 is defined as V' and a difference between the second signal source $T_A^+$ and the output $T_1$ of the second noise source 35 is defined as V''.

An output $U_i$ of the radio-thermometer system 30 in response to a predetermined signal source can be defined by Equation (1) below:

$$U_i = kT_i + u_0 \tag{1}$$

where k is a transmission coefficient, $T_i$ is an effective noise temperature of the predetermined signal source, and $u_0$ is a constant, which is independent of the predetermined signal source.

Outputs $U_1$, $U_2$, and $U_A$ of the radio-thermometer system 30 in response to the third signal source $T_1$, the fourth signal source $T_2$, and the signal $T_A$ received by the antenna 32, respectively, can be obtained using Equations (2) below:

$$U_1 = kT_1 + u_0$$

$$U_2 = kT_2 + u_0$$

$$U_A = kT_A + u_0 \tag{2}$$

Equations (2) are rearranged into Equation (3) below:

$$T_A = T_1 + M\Delta U_A, \text{ where} \tag{3}$$

$$M = \frac{\Delta T_k}{\Delta U_k},$$

$$\Delta T_k = T_2 - T_1, \text{ and}$$

$$\Delta U_k = U_2 - U_1.$$

The signal $T_A$ received by the antenna 32, i.e., a temperature at the antenna 32, can be expressed by Equation (4) below:

$$T_A = \alpha[T(1-\Gamma) + T_{rec}\Gamma] \tag{4}$$

where α is a signal transmission coefficient of the antenna 32, T is the temperature of the target object 31 to be measured, $T_{rec}$ is an effective noise temperature of a reception terminal of the radio-thermometer system 30, and Γ is a reflection coefficient. Equation (4) is disclosed in K. M. Ludeke, et al. in "A New Radiation Balance Microwave Thermograph for Simultaneous and Independent Noise Temperature and Emissivity Measurements" (Journal of Microwave Power and Electromagnetic Energy, Vol. 14, No. 2, 1979).

Equation (4) can be expanded into Equations (5) or (6) by calibrating the radio-thermometer system 30 using a first reference object having the first reference temperature and a second reference object having the second reference temperature.

$$\alpha[T_{st1}^{k}(1-\Gamma_{st})+(T_0-\Delta T)\Gamma_{st}]=T_1+M\Delta U'_{st1}{}^k$$

$$\alpha[T_{st1}^{k}(1-\Gamma_{st})+(T_0-\Delta T)\Gamma_{st}]=T_1+M\Delta U''_{st1}{}^k \quad (5)$$

$$\alpha[T_{st2}^{k}(1-\Gamma_{st})+(T_0-\Delta T)\Gamma_{st}]=T_1+M\Delta U'_{st2}{}^k$$

$$\alpha[T_{st2}^{k}(1-\Gamma_{st})+(T_0-\Delta T)\Gamma_{st}]=T_1+M\Delta U''_{st2}{}^k \quad (6)$$

where $T_{st1}^{k}$ is the first reference temperature, e.g., about 32° C. (89.6° F.), and $T_{st2}^{k}$ is the second reference temperature, e.g., about 42° C. (107.6° F.).

The effective noise temperature $T_{rec}$ of the reception terminal can be expressed by Equation (7) below:

$$T_{rec}=T_0\pm\Delta T \quad (7),$$

where $T_0$ is an effective noise temperature of a port of the antenna 32, which is equal to the temperature of an HF module maintained by a temperature adjustment apparatus in the HF module, and ΔT is half of the difference in the temperatures of the third and fourth noise sources 36 and 37, e.g., half of 10° C., which is 5° C. Here, the HF module (not shown) is attached to a rear portion of the antenna 32.

Equations (5) are added together, and Equations (6) are added together, thereby obtaining Equations (8) below:

$$\alpha[T_{st1}^{k}(1-\Gamma_{st})+T_0\Gamma_{st}]=T_1+M\Delta\overline{U}_{st1}{}^k$$

$$\alpha[T_{st2}^{k}(1-\Gamma_{st})+T_0\Gamma_{st}]=T_1+M\Delta\overline{U}_{st2}{}^k \quad (8),$$

where $\Delta\overline{U}_{st1}{}^k$ is an average temperature of the radio-thermometer system 30 when the first noise source 34 is connected to the radio-thermometer system 30, and $\Delta\overline{U}_{st2}{}^k$ is an average temperature of the radio-thermometer system 30 when the second noise source 35 is connected to the radio-thermometer system 30.

Equations (8) can be rearranged into Equation (9) below:

$$M = \frac{\alpha(1-\Gamma_{st})(T_{st2}^k - T_{st1}^k)}{(\Delta\overline{U}_{st2}^k - \Delta\overline{U}_{st1}^k)}. \quad (9)$$

Equation (10) below can be obtained from Equations (5) and (6):

$$\Gamma = \frac{\Delta U \cdot M}{\alpha \cdot 2\Delta T}, \quad (10)$$

where $\Delta U=\Delta U''_{st2}{}^k-\Delta U'_{st2}{}^k=\Delta U''_{st1}{}^k-\Delta U'_{st1}{}^k$. Here, $\Delta U_{st1}{}'^k$ is an output of the radio-thermometer system 30, when the radio-thermometer system 30 contacts the first reference object having the first reference temperature $T_{st1}{}^k$, e.g., about 32° C. (89.6° F.), and the first noise source 34 is connected to the radio-thermometer system 30, $\Delta U''_{st1}{}^k$ is an output of the radio-thermometer system 30 when the radio-thermometer system 30 contacts the first reference object having the first reference temperature $T_{st1}{}^k$, e.g., about 32° C. (89.6° F.), and the second noise source 35 is connected to the radio-thermometer system 30, $\Delta U'_{st2}{}^k$ is an output of the radio-thermometer system 30 when the radio-thermometer system 30 contacts the second reference object having the second reference temperature $T_{st2}{}^k$, e.g., about 42° C. (107.6° F.) and the first noise source 34 is connected to the radio-thermometer system 30, and $\Delta U''_{st2}{}^k$ is an output of the radio-thermometer system 30 when the radio-thermometer system 30 contacts the second reference object having the second reference temperature $T_{st2}{}^k$, e.g., about 42° C. (107.6° F.), and the second noise source 35 is connected to the radio-thermometer system 30.

As shown in Equation (10), the reflection coefficient Γ is proportional to a difference between the output of the radio-thermometer system 30 when the first noise source 34 is connected to the radio-thermometer system 30 and the output of the radio-thermometer system 30 when the second noise source 35 is connected to the radio-thermometer system 30.

Therefore, the temperature T of the target object 31 can be obtained by substituting the temperature $T_A$ at the antenna 32 and the reflection coefficient Γ into Equation (4). Accordingly, the radio-thermometer system 30 is able to solve the problem of impedance mismatch between the antenna 32 and the target object 31.

The radio-thermometer system 30 according to an embodiment of the present invention was applied to various models of a human body each having a constant temperature, and the results are shown in Table (1) below.

TABLE (1)

| Reference Temperature of Model of Human Body (° C./° F.) | Temperature of Model of Human Body Measured by Radio-thermometer (° C./° F.) | Standard Deviation (sigma) |
|---|---|---|
| 32.00 (89.6) | 31.98 (89.56) | 0.06 |
| 34.00 (93.2) | 33.94 (93.09) | 0.05 |
| 35.00 (95.0) | 34.95 (94.91) | 0.14 |
| 36.00 (96.8) | 36.00 (96.80) | 0.04 |
| 37.00 (98.6) | 37.00 (98.60) | 0.04 |
| 38.00 (100.4) | 37.99 (100.38) | 0.04 |
| 40.00 (104.0) | 39.97 (103.95) | 0.04 |
| 42.00 (107.6) | 41.97 (107.55) | 0.04 |

More specifically, Table (1) shows results of twenty (20) measurements of temperatures of models of a human body using the radio-thermometer system 30 according to an embodiment of the present invention, averaging the measured temperatures of each of the models of a human body, and calculating a standard deviation of the measured temperatures of each of the models of a human body. The measured temperatures of each of the models of a human body except for those of the model of a human body having a temperature of 35° C. (95.0° F.) have a very small standard deviation and differ from one another by less than 0.1° C. Therefore, the radio-thermometer system 30 demonstrates an ability to achieve high precision and reproducibility of measurement of the temperature of the target object 31.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A radio-thermometer system, comprising:
   an antenna for receiving thermal energy radiated from a target object having a temperature T to be measured;
   first and second noise sources, which are maintained at different temperatures in order to obtain a reflection coefficient Γ of an interface between the antenna and the target object;
   a first switch for periodically switching between outputting an output of the first or second noise source in response to a first pulse signal;
   a circulator for adding a signal received by the antenna to a reflective wave output from the first or second noise source, via the first switch, and for transmitting an addition result in one direction;
   third and fourth noise sources, which are maintained at different temperatures;
   a second switch for periodically switching between outputting an output of the third noise source, an output of the circulator, and an output of the fourth noise source in response to a second pulse signal, the second pulse signal being in synchronization with the first pulse signal; and
   an amplifier for amplifying an output of the second switch.

2. The radio-thermometer system as claimed in claim 1, wherein the temperature T of the target object is obtained using the following equation:

$$T_A = \alpha[T(1-\Gamma) + T_{rec}\Gamma]$$

where α is a signal transmission coefficient of the antenna, and $T_{rec}$ is an effective noise temperature of the radio-thermometer system, and
   the reflection coefficient Γ is obtained by the following equation:

$$\Gamma = \frac{\Delta U \cdot M}{\alpha \cdot 2\Delta T}, \text{ where}$$

$$\Delta U = \Delta U''^k_{st2} - \Delta U'^k_{st2} = \Delta U''^k_{st1} - \Delta U'^k_{st1},$$

$$M = \frac{\alpha(1-\Gamma_{st})(T^k_{st2} - T^k_{st1})}{\left(\Delta \overline{U}^k_{st2} - \Delta \overline{U}^k_{st1}\right)}, T^k_{st1} \text{ and } T^k_{st2}$$

are the first and second reference temperatures, respectively, which are used to calibrate the radio-thermometer system, $\Delta U'^{k}_{st1}$ is an output of the radio-thermometer system when the radio-thermometer system contacts a first reference object having the first reference temperature $T_{st1}^{k}$, and the first noise source is connected to the radio-thermometer system, $\Delta U''^{k}_{st1}$ is an output of the radio-thermometer system when the radio-thermometer system contacts the first reference object having the first reference temperature $T_{st1}^{k}$, and the second noise source is connected to the radio-thermometer system, $\Delta U''^{k}_{st2}$ is an output of the radio-thermometer system when the radio-thermometer system contacts a second reference object having the second reference temperature $T_{st2}^{k}$, and the first noise source is connected to the radio-thermometer system, and $\Delta U''^{k}_{st2}$ is an output of the radio-thermometer system when the radio-thermometer system contacts the second reference object having the second reference temperature $T_{st2}^{k}$, and the second noise source is connected to the radio-thermometer system.

3. The radio-thermometer system as claimed in claim 2, wherein the first reference temperature is set to about 32° C. (89.6° F.), and the second reference temperature is set to about 42° C. (107.6° F.).

4. The radio-thermometer system as claimed in claim 1, wherein the first and third noise sources are maintained at the same temperature, and the second and fourth noise sources are maintained at the same temperature.

5. The radio-thermometer system as claimed in claim 4, wherein the first and third noise sources are maintained at a temperature of about 32° C. (89.6° F.), and the second and fourth noise sources are maintained at a temperature of about 42° C. (107.6° F.).

6. A method of measuring electromagnetic energy radiated from a human body using a radio-thermometer system, comprising:
   connecting an antenna to a target object having a temperature to be measured;
   providing first through fourth noise sources;
   enabling a first switch to periodically switch between outputting an output of the first noise source or an output of the second noise source in response to a first pulse signal;
   adding a signal received by the antenna to the output of the first switch and transmitting an addition result in one direction;
   enabling a second switch to periodically switch between outputting an output of the third noise source, the addition result, or an output of the fourth noise source in response to a second pulse signal, the second pulse signal being in synchronization with the first pulse signal; and
   amplifying an output of the second switch to a predetermined level.

7. The method as claimed in claim 6, wherein the first and third noise sources are maintained at the same temperature, and the second and fourth noise sources are maintained at the same temperature.

8. The method as claimed in claim 6, wherein the first and third noise sources are maintained at a temperature of about 32° C. (89.6° F.), and the second and fourth noise sources are maintained at a temperature of about 42° C. (107.6° F.).

9. The method as claimed in claim 6, further comprising:
   calibrating the radio-thermometer system using a first reference object having a first reference temperature and a second reference object having a second reference temperature.

10. The method as claimed in claim 9, further comprising:
    determining a reflection coefficient, the reflection coefficient being proportional to a difference between an output of the radio-thermometer system when the radio-thermometer system contacts the first reference object having the first reference temperature and the first noise source is connected to the radio-thermometer system and an output of the radio-thermometer system when the radio-thermometer system contacts the first reference object having the first reference temperature and the second noise source is connected to the radio-thermometer system.

11. The method as claimed in claim 9, further comprising:
    determining a reflection coefficient, the reflection coefficient being proportional to a difference between an output of the radio-thermometer system when the radio-thermometer system contacts the second reference object having the second reference temperature and the first noise source is connected to the radio-thermometer system and an output of the radio-thermometer system when the radio-thermometer system contacts the second reference object having the second reference temperature and the second noise source is connected to the radio-thermometer system.

* * * * *